United States Patent [19]
Niethammer et al.

[11] Patent Number: 5,911,400
[45] Date of Patent: Jun. 15, 1999

[54] SOLENOID VALVE AND METHOD FOR ITS MANUFACTURE

[75] Inventors: Bernd Niethammer, Nürtingen; Andreas Knecht, Ammerbuch, both of Germany

[73] Assignee: Hydraulik-Ring Antriebs-und Steuerungstechnik GmbH, Nurtingen, Germany

[21] Appl. No.: 08/720,026

[22] Filed: Sep. 27, 1996

[30] Foreign Application Priority Data

Sep. 27, 1995 [DE] Germany .................. 195 35 945

[51] Int. Cl.$^6$ ..................................................... F16K 31/06
[52] U.S. Cl. ..................................... 251/129.08; 251/366
[58] Field of Search ................... 251/129.08, 129.15, 251/366, 367; 137/884

[56] References Cited

U.S. PATENT DOCUMENTS

| | | | |
|---|---|---|---|
| 5,051,631 | 9/1991 | Anderson | 251/129.08 |
| 5,163,477 | 11/1992 | Takano et al. | 251/129.08 X |
| 5,197,508 | 3/1993 | Göttling et al. | 251/129.08 X |
| 5,571,248 | 11/1996 | Seetharaman et al. | 251/129.08 X |

*Primary Examiner*—Kevin Lee
*Attorney, Agent, or Firm*—Robert W. Becker & Associates

[57] ABSTRACT

A solenoid valve has a solenoid including a push rod. The solenoid has a central axis along which the push rod is displaceable. A valve member with a piston is provided, and the valve member and solenoid are enclosed in a casing. The solenoid and the valve member are connected to one another before being mounted in the casing such that the solenoid and the valve member are movable relative to one another in a direction perpendicular to the central axis.

23 Claims, 2 Drawing Sheets

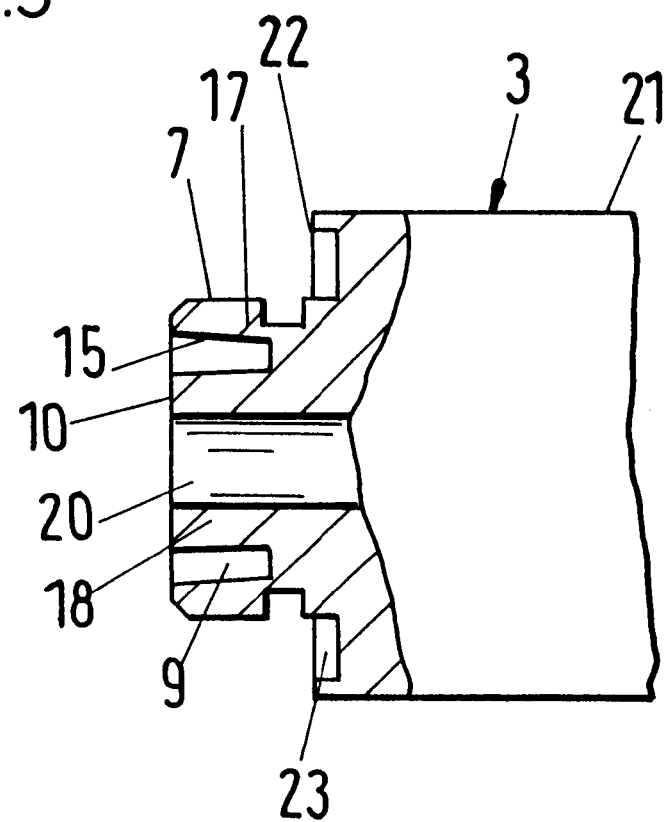
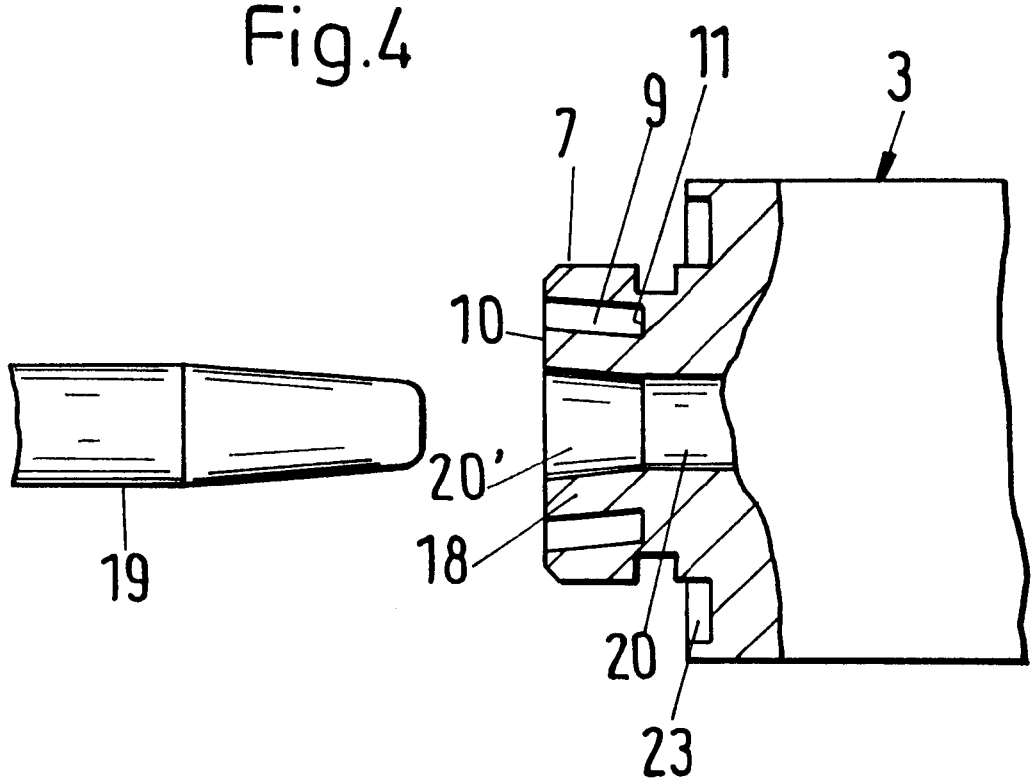

SOLENOID VALVE AND METHOD FOR ITS MANUFACTURE

BACKGROUND OF THE INVENTION

The present invention relates to a solenoid valve, especially a cartridge valve, comprising a solenoid, including an armature, a push rod, and a coil, and further comprising a valve member, preferably a hydraulic part, with a piston. The invention also relates to a method for manufacturing such a solenoid valve.

In known proportional solenoid valves the valve member and the solenoid are, for example, rigidly connected by press-fitting or with screw connection. When mounting these parts in a casing, there is often the problem encountered that upon insertion of the valve member into the corresponding receiving chamber a slanted position will result. Then it is easily possible that the piston of the valve member jams so that the proportional solenoid valve can no longer function properly.

It is therefore an object of the present invention to provide a solenoid valve of the aforementioned kind and a method for manufacturing such solenoid valve with which during mounting of the valve member slanted positions that may occur can be reliably compensated without the risk of the piston jamming during operation.

SUMMARY OF THE INVENTION

The inventive solenoid valve is primarily characterized by:

A solenoid comprising a push rod, the solenoid having a central axis along which the push rod is displaceable;

A valve member comprising a piston;

A casing;

The solenoid and the valve member connected to one another before being mounted in the casing such that the solenoid and the valve member are movable relative to one another in a direction perpendicular to the central axis.

Preferably, the valve member is also axially movable relative to the solenoid.

Expediently, the solenoid comprises an end face facing the valve member, the end face having an annular groove.

In a preferred embodiment of the present invention the solenoid has a central bore in which the push rod is guided. The central bore has a central opening in the end face and the push rod projects outwardly from the central opening. The central opening widens radially outwardly in the direction toward the valve member.

Advantageously, the annular groove has a radially inner sidewall extending at a slant radially outwardly.

The valve member has a cylindrical projection.

Advantageously, the valve member comprises a housing and the housing comprises the cylindrical projection.

Expediently, the cylindrical projection engages the annular groove. Preferably, the cylindrical projection is press-fitted into the annular groove.

Expediently, the cylindrical projection has a wall with a wall thickness, and the wall thickness is selected such that the cylindrical projection can be pivoted relative to the solenoid.

Advantageously, the solenoid valve further comprises at least one sealing member, wherein the valve member is secured in the casing with the at least one sealing member.

The at least one sealing member is preferably selected from the group consisting of an axial seal and a radial seal.

The solenoid valve is preferably a proportional valve.

The present invention also relates to a method of manufacturing a solenoid valve. The inventive method is primarily characterized by the following steps:

Machining into the end face of a solenoid an axially extending annular groove;

Radially widening a central bore of the solenoid such that an inner sidewall of the annular groove is radially outwardly deformed;

Producing a valve member with a cylindrical projection;

Press-fitting the cylindrical projection of the valve member into the annular groove for connecting the valve member and the solenoid to a unit.

The step of machining is preferably performed by milling.

The method expediently further comprises, after the step of press-fitting, the step of inserting the unit of the valve member and the solenoid into the receiving chamber of a casing.

Due to the inventive embodiment a slanted position of the valve member during mounting in a corresponding receiving chamber of a casing can be simply and effectively compensated because the valve member can be easily pivoted relative to the solenoid. Thus, it is reliably prevented that the piston of the valve member in operation of the solenoid valve can jam and get stuck. With the inventive embodiment the functional reliability of the solenoid valve will not be affected even when the receiving chamber has an axis that extends at an angle to the axis of the solenoid. The valve member, due to its movability relative to the solenoid, can be displaced into any desired slanted position in order to thus compensate any occurring manufacturing tolerances. With the inventive method, the solenoid valve can furthermore be produced in a simple and inexpensive manner.

BRIEF DESCRIPTION OF THE DRAWINGS

The object and advantages of the present invention will appear more clearly from the following specification in conjunction with the accompanying drawings, in which:

FIG. 3 shows the solenoid of FIG. 1 partly in axial section during manufacture of the annular groove at the end face; and FIG. 4 shows the solenoid of FIG. 3 during widening of the axial bore at the end face.

DESCRIPTION OF PREFERRED EMBODIMENTS

The present invention will now be described in detail with the aid of several specific embodiments utilizing FIGS. 1 through 4.

Figure 1:
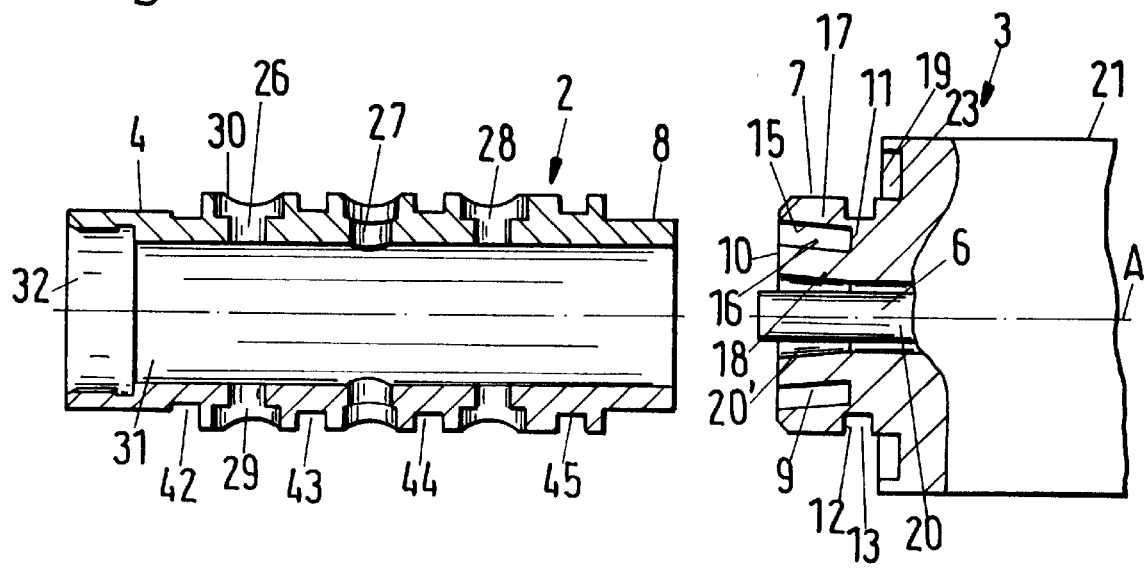
FIG. 1 shows the hydraulic member and the solenoid of the inventive solenoid valve in an exploded view, the solenoid valve being embodied as a proportional valve.
Figure 2:
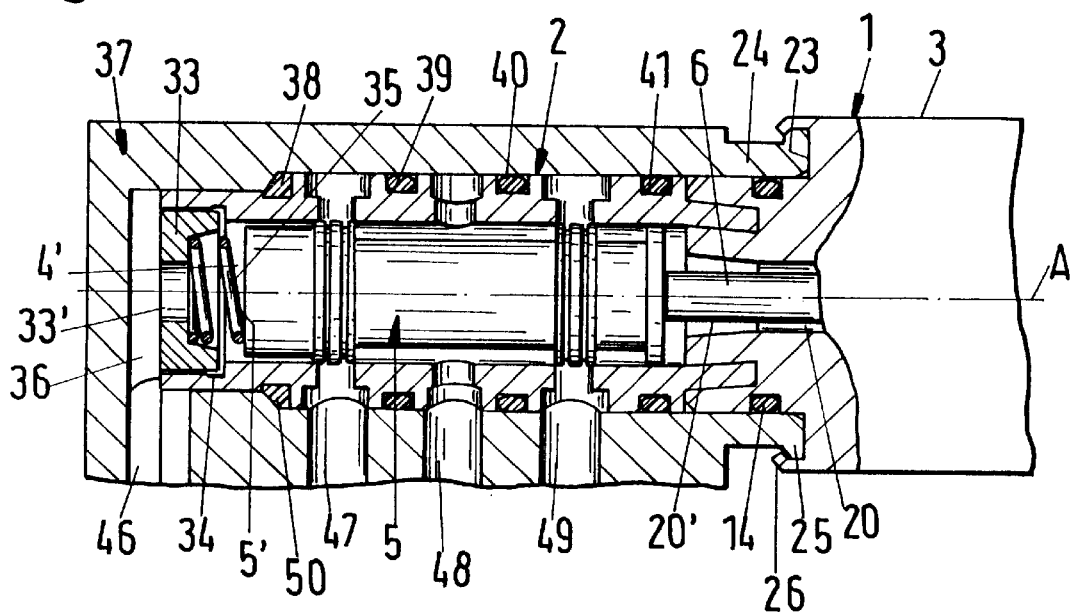
FIG. 2 shows in an axial section the proportional solenoid valve of FIG. 1 in the mounted position within a casing.

FIGS. 1 and 2 show a proportional solenoid valve 1 in the form of a cartridge valve. It is comprised of a hydraulic valve member 2 and a solenoid 3 which in the mounted position are connected to one another.

The hydraulic valve member 2 is embodied in a manner known per se, comprising a housing 4 and a piston 5 slidably arranged therein.

The housing 4 is substantially in the form of a cylindrical part with an axial bore 31. The housing 4 comprises connectors 26 to 28 which are in the form of a pressure connector, a working connector, and a tank connector. The bore 31 has a section 32 facing away from the solenoid 3. The solenoid 3 is also embodied in a manner known per se, comprising a coil, an armature, and a push rod 6. The ends 7 and 8 of the solenoid 3 and the hydraulic valve member 2, respectively, face one another and are to be connected to one another. For this purpose, they are embodied in a special design which will be disclosed in the following.

The end 7 of the solenoid 3 is tapered relative to the remaining body 21 of the solenoid. The end 7 has a transition via shoulder 19 into the solenoid body 21. The solenoid 3 has a central bore 20. In the central bore 20 the push rod 6 is positioned which projects slightly past the end face 10 of the solenoid end 7. The solenoid 3 furthermore comprises an annular groove 9 which opens into the end face 10. The bottom 11 of the annular groove 9 extends radially and is positioned approximately at the level of the sidewall 12 of a circumferential groove 13 at the end face 10 that receives an annular seal 14 (FIG. 2). The other oppositely arranged inner sides 15 and 16 of the annular sidewalls 17 and 18 extend parallel to one another. Relative to the longitudinal (central) axis A of the solenoid 3 they are slightly outwardly slanted. During the manufacture of the solenoid 3, the sidewall 18 is plastically deformed into the aforementioned slanted position, as will be disclosed in the following. As shown in FIGS. 3 and 4, the annular groove 9 is first machined into the end 7 of the solenoid 3 beginning at the end face 10. This is preferably done by milling. The inner side 15 of the groove sidewall 17 is slightly outwardly slanted so that the width of the annular groove 9 increases outwardly toward the end face 10. Subsequently, the central bore 20 is widened with an expanding tool 119, preferably a spreading device (FIG. 4) etc. With this radial widening the inner sidewall 18 of the annular groove 9 is radially outwardly deformed such that it assumes the contour of a truncated cone. Accordingly, the forward bore section 20' of the bore 20 widens axially outwardly toward the end face 10 (FIG. 4). The section 20' of the central bore 20 extends approximately to the level of the bottom 11 of the annular groove 9.

In the shoulder 19 (FIG. 1) of the solenoid 3 an annular groove 23 is provided which extends coaxially to the bore 20. In the axial direction it surrounds the solenoid end 7. The annular groove 23 is engaged by an annular flange 24 of a cylindrical end section of the casing 37 of the proportional solenoid valve. The radially externally positioned annular wall 23' of the annular groove 23 is plastically deformed such that the annular wall 23' engages above a free end 25 of the annular flange 24 in a positive-locking manner. Thus, a movable connection that is movable in all directions but cannot be released is provided between the casing 37 and the solenoid 3.

The end 8 of the hydraulic valve member 2 is in the form of a cylindrical projection. For connecting the solenoid 3 and the valve member 2, the end 8, during mounting, is pressed into the annular groove 9 that has been formed in the aforedescribed manner by plastic deformation of the inner annular groove wall 18. By doing so, the cylindrical projection 8 is correspondingly plastically deformed, i.e., bent conically inwardly. The wall of the projection 8 of the hydraulic valve member 2 is of such thickness that the plastic deformation occurs with corresponding axial forces in a reliable manner, without the annular walls 17, 18 being plastically deformed. In this manner, the solenoid 3 is connected axially with the hydraulic valve member 2 before mounted in the casing 37 so that the hydraulic valve member 2 cannot be removed from the solenoid.

The projection 8 and the annular groove 9 of the solenoid 3 are selected such with respect to their size that the hydraulic valve member 2 can be pivoted relative to the solenoid 3. In this manner, between these two parts 2 and 3 a certain movability transverse to the longitudinal axis (central axis) A is achieved. This has the advantage that upon mounting of the unit, comprised of hydraulic valve member 2 and solenoid 3, to the receiving chamber 36 of the casing 37 a jamming of the piston 5 can be reliably prevented even when the axis of the receiving chamber 36 is at an angle to the axis A of the solenoid 3. The hydraulic valve member 2, due to its movability relative to the solenoid 3, can thus assume a certain slanted position. Accordingly, its function is reliable and cannot be not impeded by possibly occuring tolerances and the resulting slanted relative position of the parts 2,3 connected to one another. The unit 2, 3 can be inserted into the receiving chamber 36 so that even for manufacturing tolerances of the diameter of the receiving chamber, respectively, of the housing 4 of the hydraulic valve member 2 a jamming of the piston is prevented. The hydraulic valve member 2 is advantageously movable relative to the solenoid 3 before mounting. This can be achieved with a corresponding axial length of the projection 8 and/or axial depth of the annular groove 9. The axial play between parts 2 and 3 is eliminated in the mounted position by arranging an annular seal 38 between the hydraulic valve member 2 and the inner shoulder 50 of the receiving chamber 36. This results in an axial prestress in the mounted position with which the axial play can be reliably cancelled.

A nut 33 (FIG. 2) is threaded into the widened bore section 32 and provides a central opening 33' which is surrounded by the conically outwardly widening opening section 34. It thus faces the solenoid 3 and surrounds a pressure spring 35 which, in the mounted position of the proportional solenoid valve 1, is supported at one end 5' of the piston 5'. The piston 4 is maintained in constant abutment at the push rod 6 by the pressure spring 35. The nut 33 serves to exactly adjust the prestress force of the pressure spring 35.

In the mounted position according to FIG. 2, the hydraulic valve member 2 with its piston 5 is positioned within the receiving chamber 36 of the casing 37. For sealing the hydraulic valve member 2 and the solenoid 3 relative to the casing 37, further annular ring seals 39, 40, 41 and 14 are provided in addition to the annular ring seal 38. They are positioned in circumferential annular grooves 42 to 45 of the hydraulic housing 4 and the annular groove 13 of the solenoid 3 (FIG. 1). The annular grooves 42 to 45 are positioned behind and between the connectors 26 to 28 which in the mounted position communicate with the bores 47 to 49 within the casing 37. Due to the annular seals 39 to 41 the housing 4 of the hydraulic valve member 2 is supported in a floating arrangement within the receiving chamber 36 of the casing 37.

Upon assembly of the proportional solenoid valve 1 the hydraulic valve member 2 is press-fitted with its end 8 into the annular groove 9 of the solenoid 3, whereby the end 8, as disclosed, is radially inwardly plastically deformed. This provides an axial securing action for both parts 2, 3. Subsequently, the two parts 2, 3 are together inserted into the receiving chamber 36 of the casing 37 whereby even for axial deviations of the casing 37 and the inserted units 2, 3 a reliable alignment and mounting is ensured. Possibly occuring slanted positions can be prevented due to the movability of the hydraulic valve member 2 relative to the solenoid 3. The unit comprised of parts 2 and 3 is reliably sealed within the casing 37 by the annular seals 38 to 41. Additionally, the axial play between the hydraulic valve member 2 and the solenoid 3 can be eliminated in the manner described above. Upon mounting of the unit 2, 3 within the component 37 (assembly of the solenoid valve), the end 24 of the casing 37 is fastened within the annular groove 23 of the solenoid 3 in the aforedescribed manner.

The disclosed arrangement, of course, is suitable for any other type of solenoid valve.

The present invention is, of course, in no way restricted to the specific disclosure of the specification and drawings, but also encompasses any modifications within the scope of the appended claims.

What we claim is:

1. A solenoid valve comprising:
   a solenoid comprising a push rod, said solenoid having a central axis along which said push rod is displaceable;
   a valve member comprising a piston;
   a casing;
   said solenoid and said valve member connected to one another before being mounted in said casing such that said solenoid and said valve member are moveable relative to one another in a direction perpendicular to said central axis;
   wherein said solenoid comprises an end face facing said valve member, said end face having an annular groove; and
   wherein said solenoid has a central bore in which said push rod is guided, said central bore having a central opening in said end face, said push rod projecting outwardly from said central opening, said central opening widening radially outwardly in a direction toward said valve member.

2. A solenoid valve according to claim 1, wherein said valve member is axially moveable relative to said solenoid.

3. A solenoid valve according to claim 1, wherein said valve member has a cylindrical projection.

4. A solenoid valve according to claim 3, wherein said valve member comprises a housing and wherein said housing comprises said cylindrical projection.

5. A solenoid valve according to claim 3, wherein said cylindrical projection engages said annular groove.

6. A solenoid valve according to claim 5, wherein said cylindrical projection is press-fitted into said annular groove.

7. A solenoid valve according to claim 3, wherein said cylindrical projection has a wall having a wall thickness such that said cylindrical projection is pivotable relative to said solenoid.

8. A solenoid valve according to claim 3, further comprising at least one sealing member, wherein said valve member is secured in said casing with said at least one sealing member.

9. A solenoid valve according to claim 8, wherein said at least one sealing member is selected from the group consisting of an axial seal and a radial seal.

10. A solenoid valve according to claim 1, wherein said solenoid valve is a proportional valve.

11. A solenoid valve comprising:
    a solenoid comprising a push rod, said solenoid having a central axis along which said push rod is displaceable;
    a valve member comprising a piston;
    a casing;
    said solenoid and said valve member connected to one another before being mounted in said casing such that said solenoid and said valve member are moveable relative to one another in a direction perpendicular to said central axis;
    wherein said solenoid comprises an end face facing said valve member, said end face having an annular groove; and
    wherein said annular groove has a radially inner sidewall extending at a slant radially outwardly.

12. A solenoid valve according to claim 11, wherein said valve member has a cylindrical projection.

13. A solenoid valve according to claim 12, wherein said valve member comprises a housing and wherein said housing comprises said cylindrical projection.

14. A solenoid valve according to claim 12, wherein said cylindrical projection engages said annular groove.

15. A solenoid valve according to claim 14, wherein said cylindrical projection is press-fitted into said annular groove.

16. A solenoid valve according to claim 12, wherein said cylindrical projection has a wall having a wall thickness such that said cylindrical projection is pivotable relative to said solenoid.

17. A solenoid valve according to claim 12, further comprising at least one sealing member, wherein said valve member is secured in said casing with said at least one sealing member.

18. A solenoid valve according to claim 17, wherein said at least one sealing member is selected from the group consisting of an axial seal and a radial seal.

19. A solenoid valve according to claim 11, wherein said solenoid valve is a proportional valve.

20. A solenoid valve according to claim 11, wherein said valve member is axially moveable relative to said solenoid.

21. A method of manufacturing a solenoid valve, said method comprising the steps of:
    machining into an end face of a solenoid an axially extending annular groove;
    radially widening a central bore of said solenoid such that an inner wall of said annular groove is radially outwardly deformed;
    producing a valve member with a cylindrical projection;
    press-fitting said cylindrical projection of said valve member into said annular groove for connecting said valve member and said solenoid to a unit.

22. A method according to claim 21, wherein said step of machining is performed by milling.

23. A method according to claim 21, further comprising, after the step of press-fitting, the step of inserting said unit of said valve member and said solenoid into a receiving chamber of a casing.

* * * * *